United States Patent [19]
Verduijn et al.

[11] Patent Number: 5,783,168
[45] Date of Patent: Jul. 21, 1998

[54] ZSM-22 ZEOLITE

[75] Inventors: Johannes Petrus Verduijn, Leefdaal; Luc Roger Marc Martens, Meise, both of Belgium

[73] Assignee: Exxon Chemical Patents Inc., Houston, Tex.

[21] Appl. No.: 734,248

[22] Filed: Oct. 16, 1996

Related U.S. Application Data

[63] Continuation of Ser. No. 353,427, filed as PCT/EP93/01359 May 28, 1993.

[30] Foreign Application Priority Data

Jun. 5, 1992 [EP] European Pat. Off. ............ 92305181

[51] Int. Cl.$^6$ .................... C01B 33/36; C01B 39/02
[52] U.S. Cl. .................... 423/702; 423/704; 423/705; 423/706; 423/707; 423/708; 423/709; 423/718; 423/DIG. 35; 502/71; 502/77
[58] Field of Search .................... 423/702, 704, 423/705, 706, 707, 708, 709, 718, DIG. 35; 502/71, 77

[56] References Cited

U.S. PATENT DOCUMENTS

| | | | |
|---|---|---|---|
| 3,808,326 | 4/1974 | McDaniel et al. | 423/709 |
| 4,481,177 | 11/1984 | Valyocsik | 502/77 |
| 4,483,835 | 11/1984 | Zones | 423/DIG. 35 |
| 4,533,649 | 8/1985 | Ball et al. | 423/DIG. 35 |
| 4,556,477 | 12/1985 | Dwyer | 208/111 |
| 4,818,509 | 4/1989 | Dwyer et al. | 423/709 |
| 4,900,528 | 2/1990 | Lowe et al. | 423/708 |
| 5,342,596 | 8/1994 | Barri et al. | 502/77 |

FOREIGN PATENT DOCUMENTS

| | | | |
|---|---|---|---|
| 1202941 | 4/1986 | Canada | 502/71 |
| 57049 | 8/1982 | European Pat. Off. | |
| 87017 | 8/1983 | European Pat. Off. | |

*Primary Examiner*—Mark L. Bell
*Assistant Examiner*—Louis M. Troilo
*Attorney, Agent, or Firm*—John F. Hunt

[57] ABSTRACT

ZSM-22 zeolite which is particularly pure and whose synthesis does not require the synthesis mixture to be stirred can be produced by the addition to the synthesis mixture of a small quantity e.g. 1000 ppm. of preformed ZSM-22 zeolite seed crystals.

6 Claims, 7 Drawing Sheets x2500 x40,000

ZSM-22 ZEOLITE

This application is a rule 60 continuation of U.S. patent application Ser. No. 353,427, filed Dec. 9, 1994, now allowed, and claims priority of PCT international application number PCT/EP93/01359, filed May 28, 1993, and European Patent Application No. 92305181.7, filed June 5, 1992.

The present invention relates to a process for preparing ZSM-22 zeolite, a particularly pure form of ZSM-22 zeolite which may be produced by this process, and a process for using the zeolite as a catalyst in the preparation or conversion of an organic compound.

BACKGROUND OF THE INVENTION

During the 1980's a novel class of high silica aluminosilicate zeolites was identified. Zeolites denoted THETA-1, Nu-10, KZ-2, ISI-1 and ZSM-22 all show very similar X-Ray diffraction (XRD) patterns corresponding approximately to the following pattern:

XRD

| INTERPLANAR SPACING D (Å) | INTENSITY I/Io | |
|---|---|---|
| 10.90 ± 0.2 | 40 | (M–VS) |
| 8.70 ± 0.16 | 10 | (W) |
| 6.94 ± 0.10 | 13 | (W–M) |
| 5.40 ± 0.08 | 8 | (W) |
| 4.58 ± 0.07 | 10 | (W) |
| 4.36 ± 0.07 | 100 | (VS) |
| 3.68 ± 0.05 | 97 | (VS) |
| 3.62 ± 0.05 | 65 | (S–VS) |
| 3.47 ± 0.04 | 46 | (M–S) |
| 3.30 ± 0.04 | 5 | (W) |
| 2.74 ± 0.02 | 3 | (W) |
| 2.52 ± 0.02 | 19 | (W) |

For simplicity, the following text will refer to such a zeolite as a ZSM-22 zeolite.

Processes for preparing such a zeolite are described in a number of documents. In general, the synthesis mixture comprises a source of silicon (or germanium); a source of aluminium (or alternative T-atom such as gallium, boron; iron, chromium, vanadium, molybdenum, arsenic, antimony or manganese); a source of monovalent cation (such as an alkali metal) and an organic structure directing agent. This mixture is crystallised to form the zeolite.

U.S. Pat. No. 4,481,177 describes the production of ZSM-22 conducted in an autoclave stirred at about 400 rpm.

EP-A-65400 describes the production of a zeolite denoted Nu-10 by crystallising a synthesis mixture and indicates that agitated reactions are preferred since if the agitation is inadequate or the reaction is carried out under quiescent conditions there is a distinct probability of contamination with a ZSM-5 zeolite. EP-A-87017 describes the production of a zeolite denoted ISI-1 in which a synthesis mixture is crystallised while stirring. EP-A77624 describes the production of zeolite denoted Nu-10. Agitation is said to be preferable and there are no examples of a preparation in which agitation does not occur. Although a rubidium compound is added to the stirred synthesis mixture in some instances and this is stated to encourage the formation of ZSM-22, the present applicants have found that if the process is repeated without stirring during crystallisation the product is a mixture of amorphous material and ZSM-5. The rubidium containing material does not therefore compensate for the need to stir vigorously the mixture during crystallisation.

EP-A-220873 describes a process for the preparation of zeolites ZSM-22 and ZSM-23. It is stated that the process may be carried out with or without stirring. However, all examples of the preparation of ZSM-22 are carried out with constant stirring. EP-A-57049 describes the preparation of a crystalline aluminosilicate denoted THETA-1. The crystallisation is carried out generally in a revolving pressure vessel. Traces of crystobalite contaminated some of the samples.

Stirring during crystallisation requires more complicated and therefore more expensive equipment than is required for a process in which there is no stirring. Moreover, as the prior art acknowledges; inadequate stirring leads to the formation of contaminants such as ZSM-5. Crystobalite, although it is for some purposes not such a harmful contaminant as ZSM-5, is nevertheless a contaminant. Its production is a function of temperature and the $SiO_2/Al_2O_3$ molar ratio in the synthesis mixture. Inadequate stirring of the mixture may therefore lead to pockets of mixture whose temperature allows the formation of crystobalite. Although effective stirring may be carried out in a small scale synthesis, in large scale operations it becomes increasingly difficult to provide effective stirring throughout the synthesis mixture to avoid formation of ZSM-5. Levels of contaminants such as ZSM-5 should be minimised since in some applications for which ZSM-22 is particularly applicable as a catalyst e.g. the separation of aromatic isomers, the performance of ZSM-5 is much inferior to that of ZSM-22.

The present applicants have identified a process for preparing ZSM-22 zeolite in which the crystallisation may be carried out during static or slow-speed stirring conditions.

SUMMARY OF THE INVENTION

The present invention therefore provides a process for preparing a ZSM-22 zeolite comprising crystallising a synthesis mixture comprising:

(i) a source of silicon and/or germanium;

(ii) a source of aluminium, iron, chromium, vanadium, molybdenum, arsenic, antimonic, manganese, gallium or boron;

(iii) a source of monovalent cation; and (iv) an organic structure directing agent; characterised in that seeds of preformed ZSM-22 are included in the initial synthesis mixture.

DESCRIPTION OF THE PREFERRED EMBODIMENT

Figure 1:
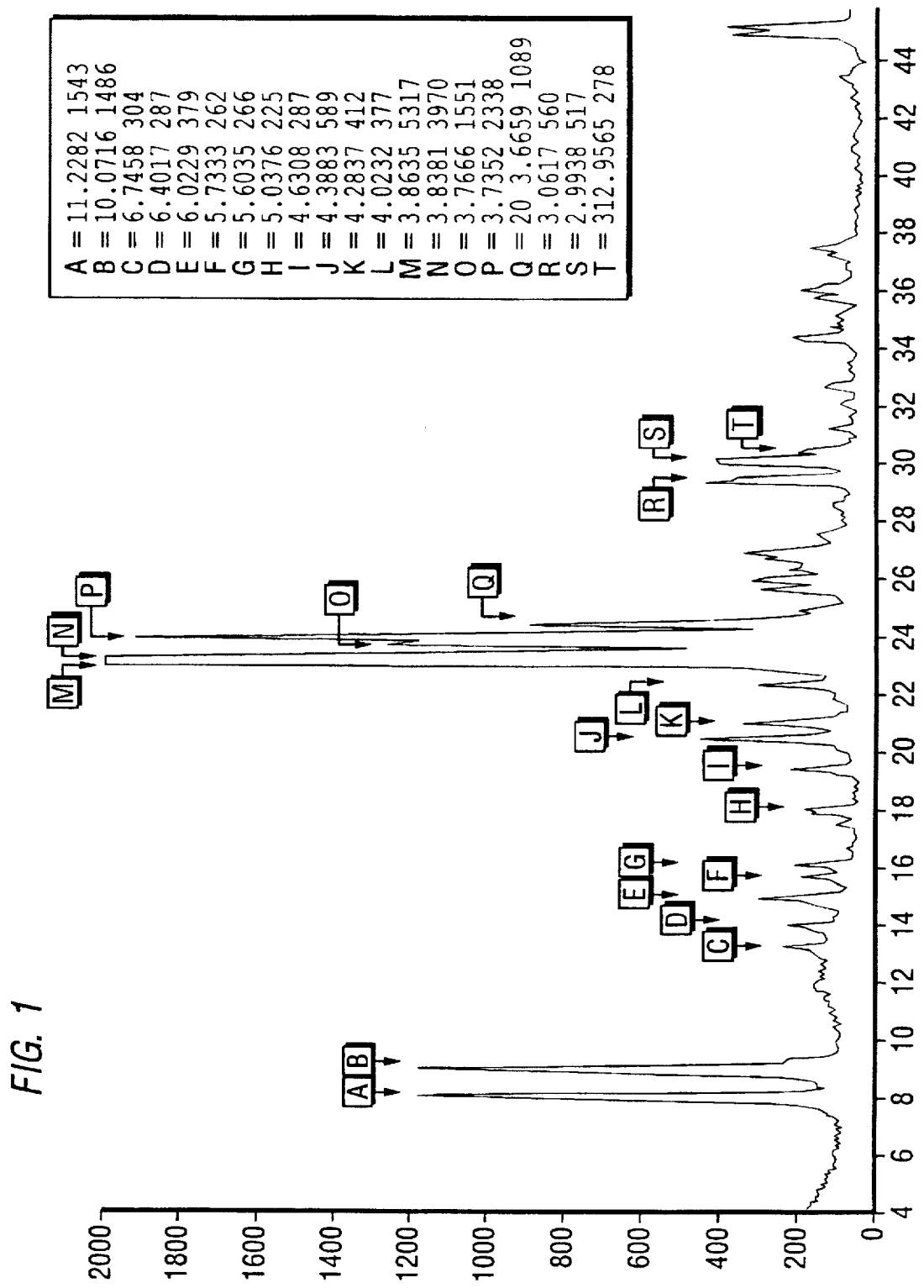
FIGS. 1 and 2 provide X-Ray diffractograms of the products of Comparative Example 1 and Example 1, respectively.

The applicants have surprisingly found that the addition of a small quantity of seed crystals of ZSM-22 is sufficient to compensate for inefficient stirring or even to replace stirring. Indeed, a synthesis mixture which in the absence of stirring produces pure ZSM-5, may produce substantially pure ZSM-22 if as little as 1000 weight ppm of ZSM-22 seed crystals are added to the same synthesis mixture.

The exact amount of ZSM-22 seeds added to the synthesis mixture will, of course, depend on the composition of the mixture. In general, at least 50 weight ppm of seeds is recommended, preferably 100 to 5000 weight ppm, more preferably 500 to 3000 weight ppm. The size of the zeolite crystals obtained is dependent on whether the synthesis mixture is stirred and on the amount of seed crystals used. The smaller the size of seed crystals used, the lower the quantity of seeds needed to achieve the desired size of the crystals.

ZSM-22 crystals tend to be needle-shaped. If the needles are long, the zeolite can have a fibrous quality similar to asbestos. Like asbestos it can therefore be a health hazard if the crystals are too long. Shorter crystals, such as can be produced using the seeding technique of the present invention, are less toxic.

The synthesis may be carried out under static conditions or may be stirred, either gently e.g. up to 50 rpm, particularly 10 to 50 rpm or more vigorously e.g. greater than 100 rpm. Stirring tends to produce a more pure product and the purity of the product is a balance of the parameters of stirring and seeding. The faster the mixture is stirred the lower the weight of seeds needed to produce pure ZSM-22. If there is no stirring i.e. the mixture is static during crystallisation, about 1000 wt ppm of seeds are needed to produce pure ZSM-22.

It is found that if a seeded synthesis mixture is stirred during crystallisation, the crystals of ZSM-22 produced tend to be smaller and purer (i.e. less contaminated) than are produced from the stirred crystallisation of the same synthesis mixture in which the seeds have been omitted.

The source of silica which may be used in the synthesis is not critical, and may be any of those commonly used when synthesising zeolites, e.g. finely divided solid silica, silicic acid or colloidal silica.

The aluminium source may be e.g. an alumina or aluminate introduced into the synthesis mixture as an alkali metal aluminate, an aluminium salt such as the sulphate or nitrate, or a hydrated form of alumina such as colloidal alumina.

The monovalent cation is suitably an alkali metal e.g. sodium or potassium. If the monovalent cation is an alkali metal, for some uses of the zeolite, the alkali metal ion is exchanged with an ammonium ion to produce a sufficiently active catalyst. An ammonium-containing zeolite may be produced directly by replacing up to about 75% of alkali metal in the synthesis mixture with a source of ammonium ion.

The organic structure directing agent directs the formation of a given molecular sieve by the so-called templating effect. The role of organic molecules in molecular sieve synthesis is discussed in articles published in the literature, e.g. Lok et al Zeolites 1983, Volume 3, pages 282 to 291 and Moretti et al, Chim. Ind. (Milan) 67, No. 1 to 2, 21 to 34 (1985). The effect of an organic structure directing agent is that in the production of the crystalline framework the organic compound behaves like a template around which the crystalline framework grows, or which causes the crystallisation to be directed to form a particular crystalline framework. Examples of structure directing agents which may be used to form the present zeolites include alkylamines and diaminoalkanes having up to 12 carbon atoms, particularly 4, 6, 8, 10 or 12 carbon atoms, e.g 1,6-diaminohexane, diethylamine, 1-aminobutane or 2,2'-diaminodiethylamine; heterocyclic organic compounds such as N-ethylpyridinium; polyalkylenepolyamines, e.g. triethylene tetramine or tetraethylenepentamine; and alkanolamines, e.g. ethanolamine or diethanolamine.

The synthesis mixture may be prepared by mixing in any order the required ingredients. The mixture is then brought to the crystallisation temperature and held there for the required time. The crystallisation temperature is preferably 80° to 200° C. Since the formation of crystobalite is encouraged by a crystallisation temperature of 165° C. or higher, it is preferred to maintain the crystallisation temperature at not more than 160° C.

Suitable crystallisation times can be established by the ordinarily skilled person. In general, crystallisation times of 20, preferably 40 to 140 hours are typical.

The yield of the process can be improved by reducing the water content of the synthesis mixture. The morphology of the crystals produced is unaffected.

The mother liquor from a first crystallisation process can be recycled and used to replace water in a second crystallisation process. The recycled mother liquor contains organic structure directing agent. This material can be expensive and is often toxic to the environment. Recycling it is therefore advantageous.

After crystallisation the zeolite product may be washed, dried, and optionally calcined.

The ZSM-22 zeolite may also be ion-exchanged to replace e.g. hydrogen or an alkali metal cation with e.g. ammonium or a metal cation such as a rare earth metal, calcium, magnesium, zinc, cadmium, manganese, palladium, nickel, copper, titanium, tin, iron or cobalt.

The zeolite may be bound with a matrix material such as clay or silica to increase its physical strength for its use as a catalyst.

The process enables the production of ZSM-22 zeolite which is particularly pure with respect to contamination by ZSM-5 or crystobalite. The purity of the ZSM-22 can be assessed from the X-Ray diffractogram. One of the strongest peaks in the ZSM-5 XRD is a reflectance at an interplanar spacing of around 3.65 to 3.85 Angstrom (0.365 to 0.385 nanometers). Contamination with crystobalite will typically lead to a distinct peak in the X-Ray diffractogram of ZSM-22 at an interplanar spacing of 4.07±0.02 Angstrom (0.407±0.002 nanometers). As indicated earlier, the strongest peak in an X-Ray diffractogram due to ZSM-22 is at 4.36±0.07 Angstrom (0.436±0.007 nanometers). Thus the present invention provides a zeolite having a ZSM-22 structure having a purity such that the X-Ray diffractogram has a ZSM-5/ZSM-22 peak height ratio of not more than 0.04, preferably not more than 0.02, and a crystobalite/ZSM-22 peak height ratio of not more than 0.05.

ZSM-22 is useful as a catalyst in a wide variety of processes for the production or conversion of organic compounds, for example cracking, hydrocracking, dewaxing, isomerisation (including e.g. olefin isomerisation and skeletal isomerisation e.g. of butene), dimerisation, oligomerisation, polymerisation, alkylation, dealkylation, hydrogenation, dehydrogenation, dehydration, cyclisation and aromatization. The present invention therefore provides a process for the production or conversion of a hydrocarbon comprising the use as a catalyst of this zeolite.

The zeolite may be calcined if appropriate before use. It may also be cation exchanged or used in acid form. It may be used in a dehydrated form or a fully or partially hydrated form.

The following examples illustrate aspects of the invention. 92A020 9

COMPARATIVE EXAMPLE 1

Crystallisation of a ZSM-22 synthesis mixture without seed crystals. Preparation of the synthesis mixture:

| Solution A: | |
|---|---|
| INGREDIENTS | QUANTITY IN GRAMS |
| $AL_2(SO_4)3.18 H_2O$ (Baker, product 1889) | 3.50 |
| KOH pellets (87.5%) (Baker, product 0222) | 7.85 |
| 1,6-diaminohexane (Janssen Chimica, product 1206436) | 16.70 |
| $H_2O$ | 177.16 |
| Rinse water | 23.95 |

The ingredients were dissolved in the water in the order shown above. The rinse water was used to rinse the beaker which contained solution A.

| Solution B: | |
|---|---|
| INGREDIENTS | QUANTITY IN GRAMS |
| Ludox AS-40 (40% $SiO_2$) | 72.02 |
| $H_2O$ | 100.03 |

The Ludox and the water were weighed in a glass mixing beaker belonging to a household mixer. The Ludox/water mixture was homogenized by mixing for a few seconds. Solution A and the rinse water were added to solution B. The resulting mixture was stirred for 15 minutes in the household mixer. The molar composition of the synthesis mixture was:

1.28 $K_2O$/3.00 R/0.110 $Al_2O_3$/10 $SiO_2$/402 $H_2O$ in which R =1,6-diaminohexane.

Crystallisation:

The synthesis mixture was divided over two stainless steel autoclaves. Both autoclaves were placed in a room temperature oven. The oven was heated up within 2 hours to 160° C. One of the autoclaves was removed from the oven after 72 hours at 160° C., the other one was removed after 97 hours.

Washing and Recovery

Upon opening of the "72 hours autoclave" it appeared that the synthesis magma was very viscous and there was no clear motherliquor. This indicated an incomplete crystallisation. After homogenizing, a sample was taken from the autoclave. The sample was washed several times with water and subsequently dried at 105° C. for 3 hours.

The 97 hours synthesis magma had a clear motherliquor while the crystals were settled at the bottom of the autoclave. After homogenizing a sample was taken. The sample was washed several times with water and was dried at 105° C. for 3 hours.

Characterisation

XRD showed that the 72 hours product was largely amorphous with a small quantity of ZSM-5. The 97 hours product was excellently crystalline ZSM-5 without a trace of ZSM-22.

EXAMPLE 1

Using the same ingredients and procedures as described above a synthesis mixture was prepared with an identical molar composition but which now contained 0.04 wt % of preformed ZSM-22 crystals (based on the weight of the synthesis mixture). During the preparation of the synthesis mixture the seed crystals were dispersed in solution B. Of the seeded synthesis mixture 278.94 g was transferred to a 300 ml stainless steel autoclave.

Crystallisation:

The autoclave was placed in a room temperature oven, the oven was heated up within 2 hours to 160° C. and was kept at this temperature for 72 hours without stirring.

Washing and Recovery

The product was washed with water to pH 9.4 and dried at 95° C. for 4 hours. The quantity of dry product recovered was 16.3 g.

Characterisation:

XRD showed that the product was ZSM-22 contaminated with ZSM-5. The ZSM-5/ZSM-22 peak height ratio was 0.40. The crystobalite/ZSM-22 peak height ratio was less than 0.01. SEM showed that the product consisted of sheaf-like crystals with a length of ~15 microns.

Figure 2:
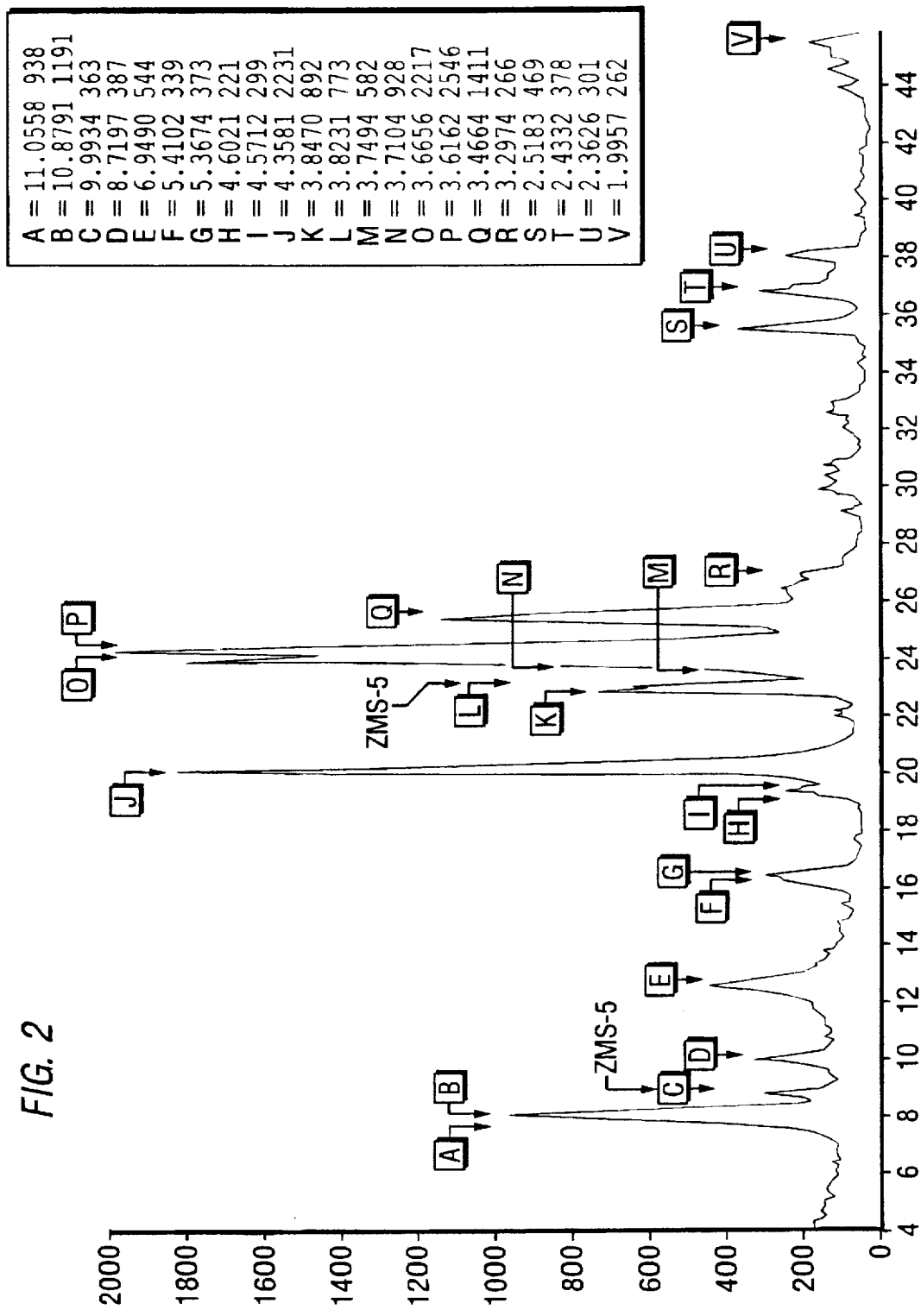

X-Ray diffractograms of the products of Comparative Example 1 and Example 1 are given in FIGS. 1 and 2.

From the results it can be seen that a synthesis mixture capable of forming zeolite ZSM-22 under static crystallisation conditions only gives this zeolite when the synthesis mixture crystallises in the presence of preformed ZSM-22 crystals.

EXAMPLE 2

A synthesis mixture with molar composition of:

1.26 $K_2O$/3.01 R/0.108 $Al_2O_3$/10 $SiO_2$/398 $H_2O$ was prepared using the same ingredients and procedure as described above. In this case the amount of seed crystals was increased from 0.04 wt % to 0.10 wt % based on the weight of the synthesis mixture.

Crystallisation:

The synthesis mixture was crystallised in a 150 ml stainless steel autoclave for 54 hours at 160° C.

Washing and Recovery:

The product was washed 4 times with ~150 ml of water to pH 9.7 and dried at 120° C.

Characterization:

XRD showed that the product was excellently crystalline ZSM-22 essentially free from zeolite ZSM-5. The ZSM-5/ZSM-22 peak height ratio was less than 0.02. The crystobalite/ZSM-22 peak height was less that 0.01.

Figure 3:
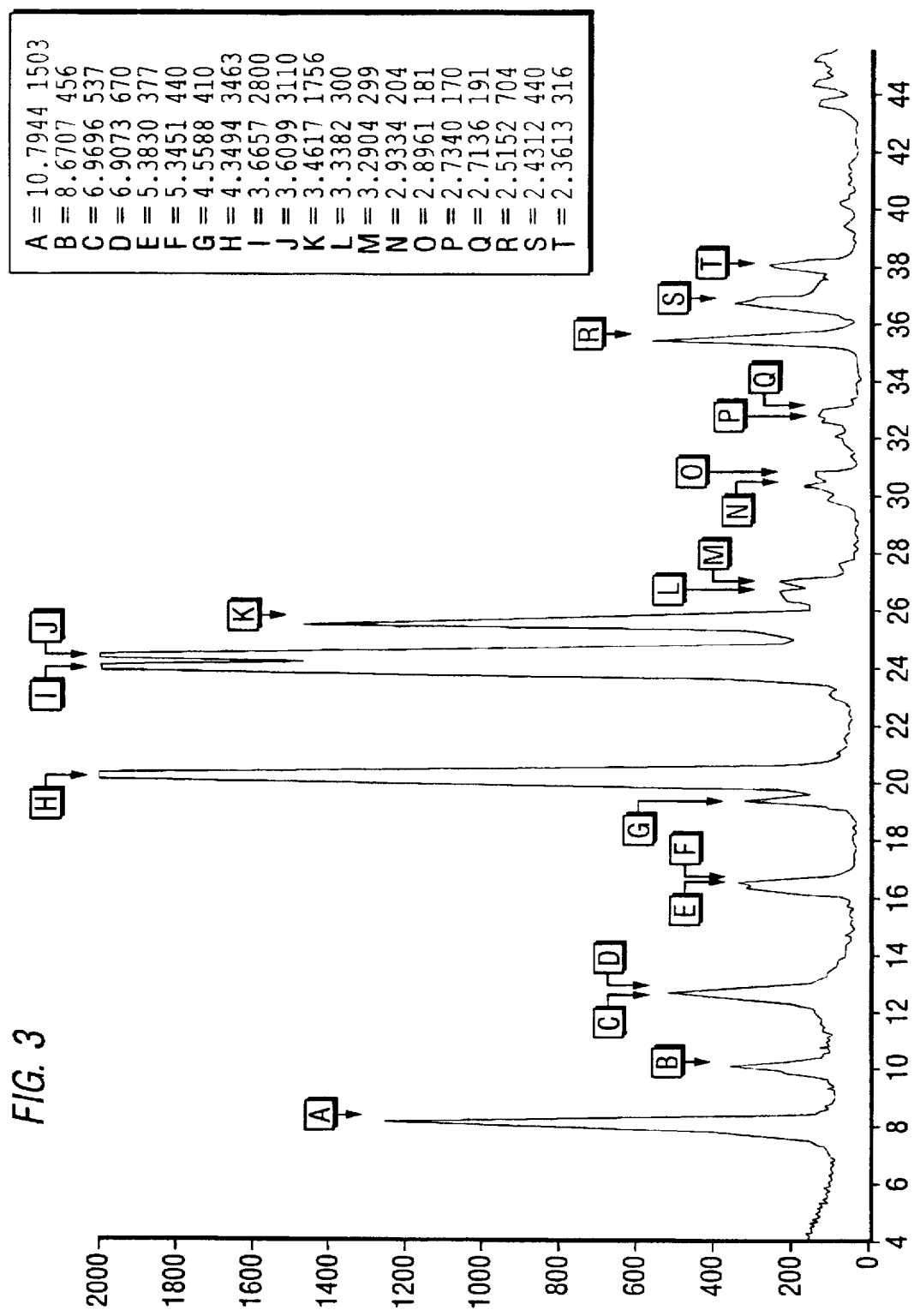
FIG. 3 shows the diffractogram of Example 2.
Figure 4:
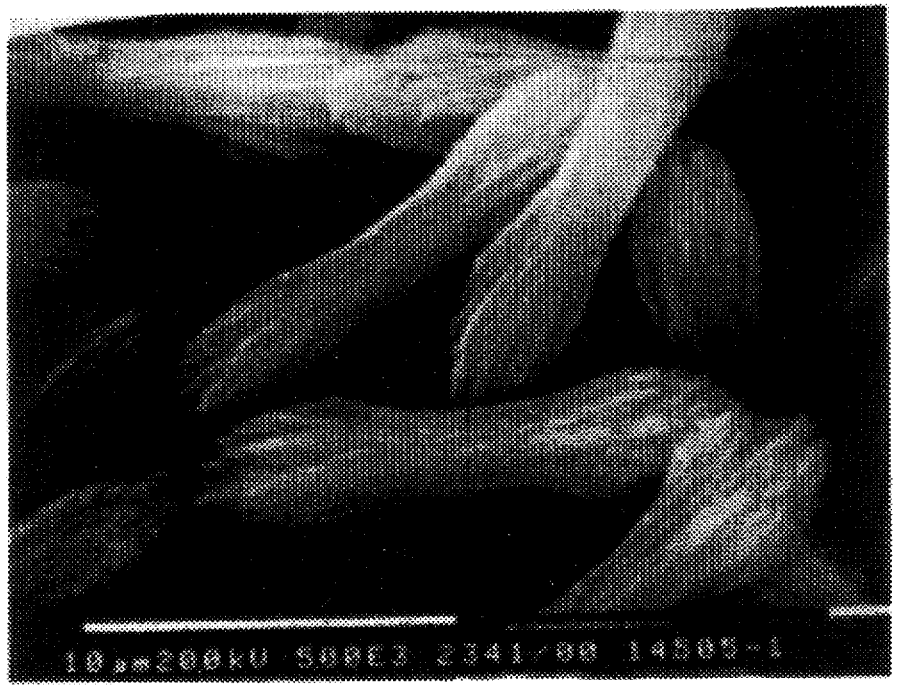
FIGS. 4 and 5 show comparative SEM micrographs of Example 1 and 2, respectively.
Figure 5:

SEM showed that the product consisted of sheaf-like crystals with a length of ~4.5 microns. Also clusters of intergrown needles can be seen FIG. 3 shows the diffractogram of Example 2. FIGS. 4 and 5 show comparative SEM micrographs of examples 1 and 2.

This result indicates that:
  pure ZSM-22 can be achieved when this zeolite crystallised under static conditions in the presence of at least 1000 wt ppm of preformed ZSM-22 crystals, and
  the crystallite size can be varied by varying the amount of seed crystals.

COMPARATIVE EXAMPLE 2

A 2.5 kg synthesis mixture with a molar composition of:

1.26$K_2O$/3.00 R/0.108 $Al_2O_3$/10 $SiO_2$/400 $H_2O$ was prepared using the same ingredients and procedure as described above. In this case the 2 solutions A and B were mixed in a 3 liter glass beaker using a low shear magnet stirrer during 5 minutes.

Crystallisation:

The synthesis mixture was divided over 2 stainless steel autoclaves. The first (non-stirred, one liter) autoclave contained 737.9 gram of the synthesis mixture. The second (2 liter stirred) autoclave contained 1601.6 g of the synthesis mixture. The 1 liter autoclave was placed in a room temperature oven. The oven was heated up to 160° C. and was kept at this temperature for 128 hours. During this time 2 spot samples were taken from the autoclave, namely after 52 hours and after 78 hours. The 2 liter autoclave was heated up to 160° C. and was kept at this temperature for 53 hours. The stirring speed was ~120 rpm.

Washing and Recovery:

One liter non-stirred synthesis:

The 128 hours product was washed with water to pH 9.2 and dried at 120° C. Weight of product recovered was: 44.8 g. The 2 spot samples (~0.5 g each) were washed with water and dried at 120° C.

Two liter stirred synthesis:

The product was washed with water to pH 9.7 and was dried at 120° C. The quantity of product recovered was 97 grams. This corresponds with a product yield of 6.1 wt %. The product yield is defined as the quantity of dry product divided by the weight of the gel in the autoclave times 100%.

Characterisation:

Non-stirred synthesis:

XRD showed that:

the 52 hours spot sample was largely amorphous with a trace of ZSM-5.

the 78 hours spot sample was partially crystalline ZSM-5.

the 128 hours product was excellently crystalline ZSM-5.

Stirred synthesis:

XRD showed that the product was excellently crystalline ZSM-22 containing traces of α-cristobalite and ZSM-5. SEM showed that the product consisted of clusters of intergrown very small (<1 micron) needles. This result again confirms that a synthesis mixture capable of forming zeolite ZSM-22 only gives this zeolite when the synthesis mixture is stirred during crystallisation. This result also indicates that stirring during crystallisation significantly reduces the crystal dimensions.

EXAMPLE 3

One of the objectives of this experiment was to investigate if slow speed stirring in combination with seeding could give ZSM-22 with the desired properties, e.g. small crystallite size and with virtually no contaminants. This experiment was done in a 25 liter autoclave equipped with a stirring system with a maximum speed of 30 rpm. The synthesis mixture was prepared as follows:

Solution A:

| INGREDIENTS | COMPONENTS | QUANTITY IN GRAMS |
| --- | --- | --- |
| LUDOX AS-40 | 1 | 3965.5 |
| $H_2O$ | 2 | 6325.5 |
| RINSE WATER | 3 | 504.0 |

Components 1 and 2 were mixed in a 10 liter plastic container.

Solution B was prepared in the autoclave:

| INGREDIENTS | COMPONENT | QUANTITY IN GRAMS |
| --- | --- | --- |
| $Al_2(SO_4)_3.18\ H_2O$ | 1 | 190.12 |
| KOH (87.5%) | 2 | 426.54 |
| 1,6-diaminohexane | 3 | 921.3 |
| $H_2O$ | 4 | 9570.0 |
| Rinse Water | 5 | 100.00 |

Component 4 was poured in the autoclave. Successively, components 1, 2 and 3 were added. Before each addition of another component the solution in the autoclave was stirred until clear. Component 5 was used to rinse the beaker which contained component 3. Component 3 was added to the contents of the autoclave. Solution A was added to solution B while stirring. Component 3 of solution A was added to rinse the container, component 3 was also added to the contents of the autoclave. To obtain the final mixture 16.50 grams of ZSM-22 seed crystals were added while continuously stirring. After the addition of the seed crystals stirring was continued for 10 minutes. During the last two minutes of stirring about 2300 g of the synthesis mixture was taken from the autoclave for later use. During the preparation of the synthesis mixture a separate, highspeed stirrer was used, not belonging to the autoclave.

The molar ratio composition of the synthesis mixture was:

1.26 $K_2O$/3.01 R/0.108 $Al_2O_3$/10 $SiO_2$/400 $H_2O$+0.075 wt % seed crystals (based on gel weight).

The quantity of synthesis mixture in the autoclave was 19.70 kg.

Crystallisation

The autoclave was closed with the autoclave head which was equipped with a stirrer. The stirrer gear was adjusted to maximum speed i.e. 30 rpm. The synthesis mixture was heated up within ~6 hours from room temperature to 159° C. ±1° C. The synthesis mixture was kept at this temperature for 50.5 hours.

Washing and Recovery of the product:

Upon opening the autoclave it appeared that the crystals were well settled at the bottom of the autoclave. The motherliquor was decanted and the product collected. The product was washed with water to a pH of 9.5. The product was dried for 16 hours at 120° C. The quantity of product recovered was 1240 g. This corresponds with a product yield of 1240/19700*100%=6.3 wt %.

Figure 6:
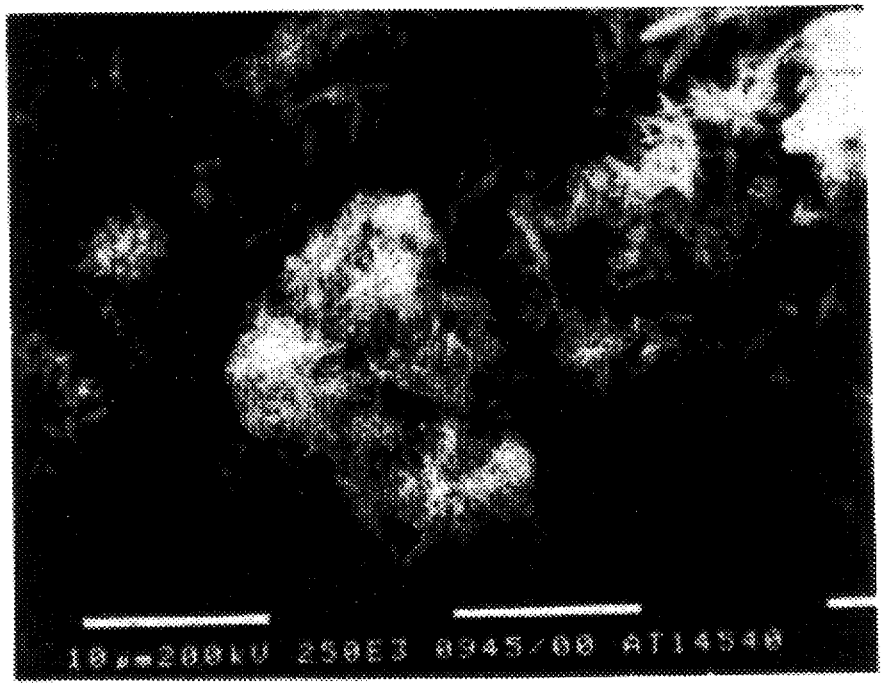
FIGS. 6 and 7 show sem micrographs of Example 3 at 2,500 and 40,000 magnification, respectively.
Figure 7:

Characterisation:

XRD showed that the product was excellently crystalline ZSM-22 without any other crystalline contaminant. The ZSM-5/ZSM-22 peak height ratio was less than 0.01. The cristobalite/ZSM-22 peak height ratio was less than 0.01. SEM micrographs showed that the product mainly consisted of very small (<1 micron) intergrown needles. The fraction of non-intergrown larger crystals was very small. FIGS. 6 and 7 show SEM micrographs of example 3 (2500* and 40000* magnification respectively).

COMPARATIVE EXAMPLE 3

This experiment was done to show that the effect of inefficient stirring on the ZSM-22 product purity can be compensated with a small quantity of ZSM-22 seed crystals. Example 3 serves as a reference.

Figure 8:
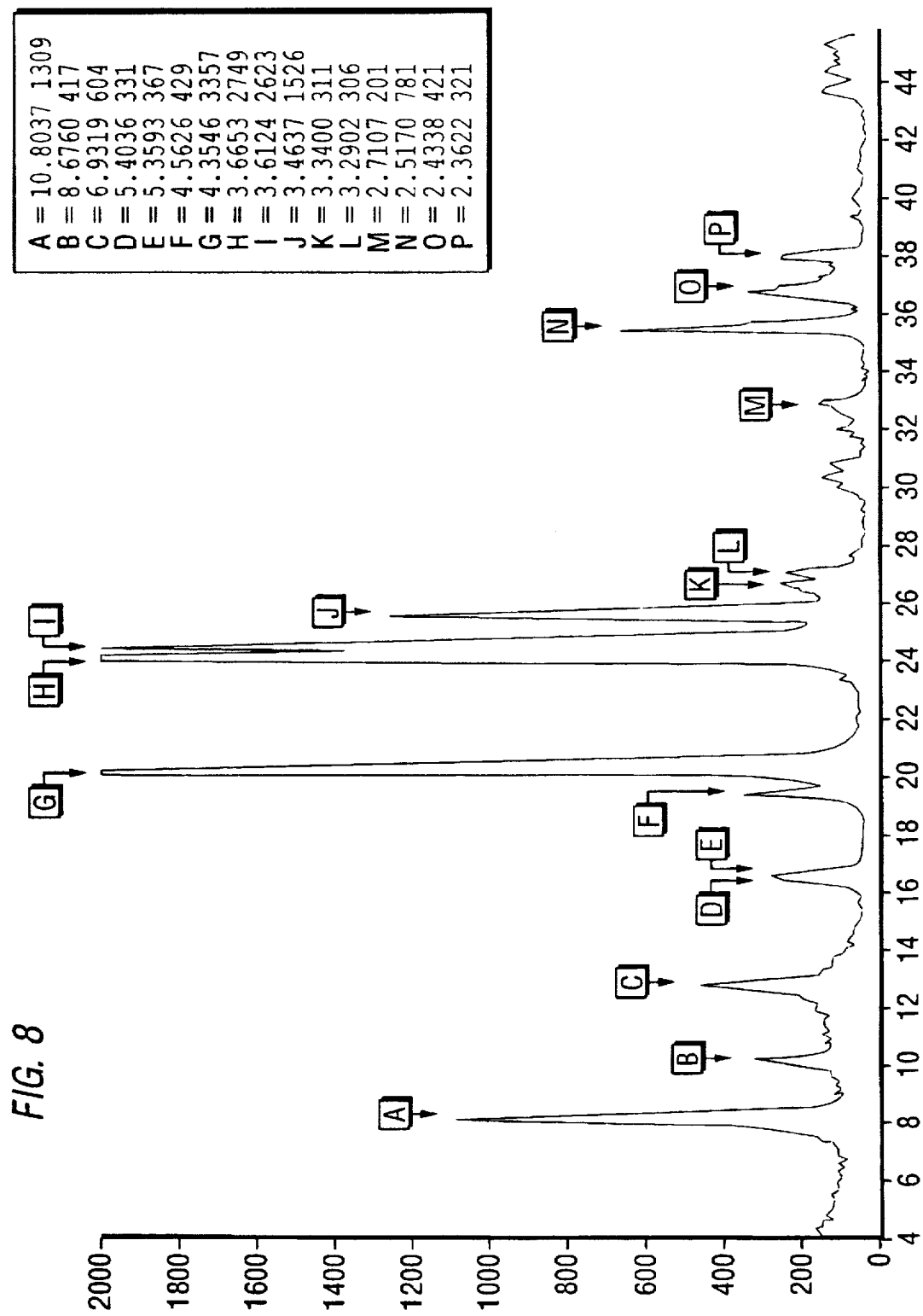
FIGS. 8 and 9 provide comparaitive X-Ray diffractogram of the products of Example 3 and Comparaitive Example 3, respectively.
Figure 9:
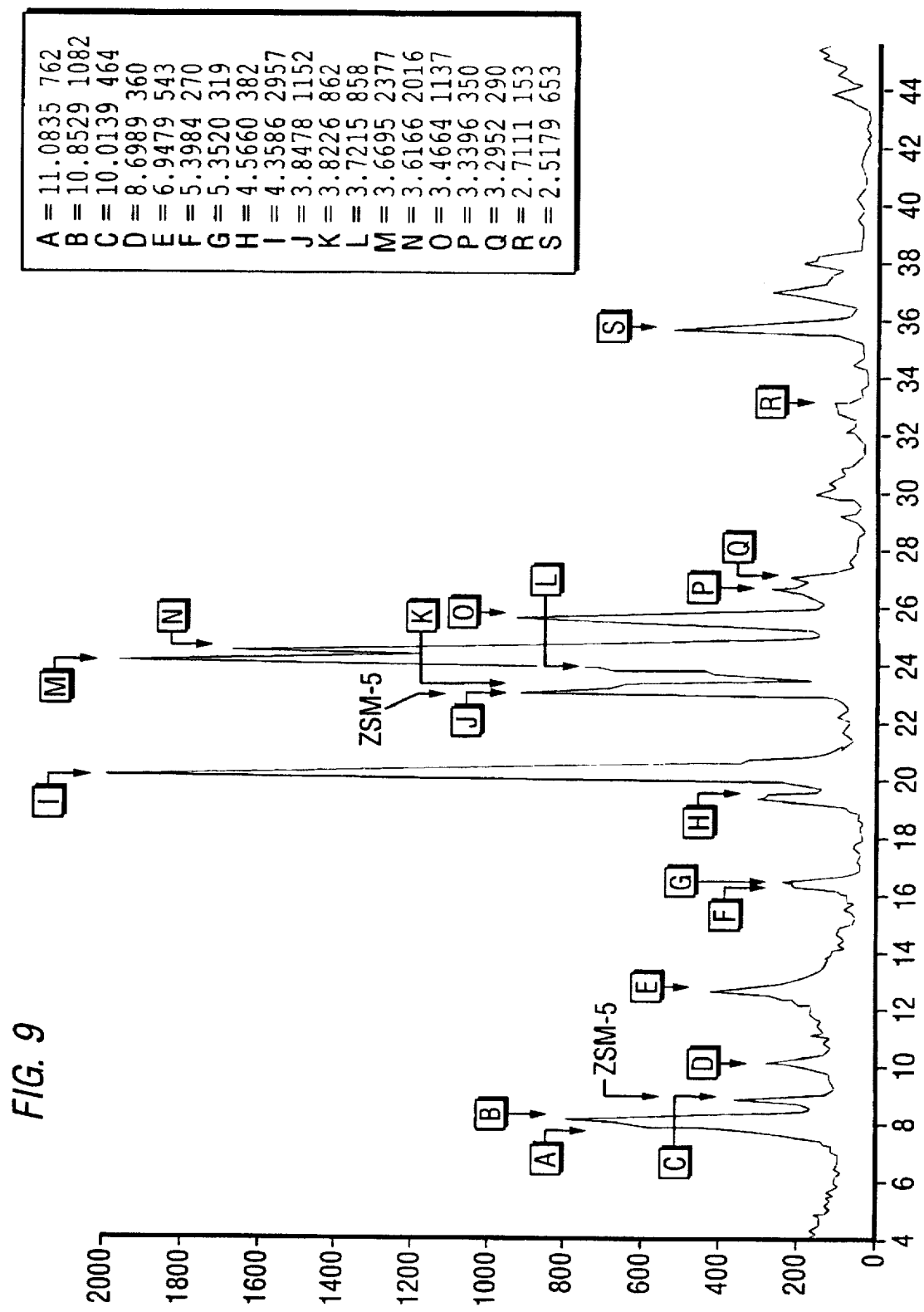

A synthesis mixture with an identical composition as in example 3 but not containing seed crystals was placed in a 2 liter stainless steel autoclave. The synthesis mixture was heated up within 6 hours to 160° C. and was kept at this temperature with stirring at 30 rpm for 51 hours. The type of stirrer was the same as was used in example 3. X-Ray diffraction showed that the product was ZSM-22 severely contaminated with ZSM-5. The ZSM-5/ZSM-22 peak height ratio was 0.39. The crystobalite/ZSM-22 peak height ratio was less than 0.01. Comparative X-Ray diffractograms of example 3 and of comparative example 3 are given in FIGS. 8 and 9.

During the course of the experimental program it appeared that crystallisation temperature is a sensitive parameter to control the formation of crystobalite; even a relatively small overshoot of the crystallisation temperature of ~5° C. above 160° C. is sufficient to contaminate the ZSM-22 product with this dense silica-rich crystalline material. It also appeared that its formation preferently takes place at the walls of the autoclave.

Although it is expected that the presence of crystobalite in the zeolite product in catalytic reactions is less detrimental than that of ZSM-5, it is highly desirable to avoid the formation of this by-product. This can be done by closely monitoring the crystallisation temperature not to exceed 160° C.

EXAMPLE 4

Synthesis of ZSM-22: 50% of Potassium replaced by ammonium.

Synthesis mixture: (weight of reactants in grams):

| | Solution A: | |
|---|---|---|
| INGREDIENTS | COMPONENTS | QUANTITY IN GRAMS |
| LUDOX AS-40 | (1) | 54.08 |
| $H_2O$ | (2) | 75.24 |

| | Solution B: | |
|---|---|---|
| INGREDIENTS | COMPONENT | QUANTITY IN GRAMS |
| $Al_2(SO_4)_3.18\ H_2O$ | (1) | 2.59 (Baker) |
| KOH (87.5%) | (2) | 2.91 (Baker) |
| 1,6-diaminohexane | (3) | 12.58 (Fluka) |
| $H_2O$ | (5) | 131.84 |
| $NH_4OH$ (29.1%) | (4) | 5.59 (Baker) |
| Rinse Water | | 16.62 |
| ZSM-22 Seeds uncalcined | | 0.36 |

Preparation of Solution B:

The water (5) was mixed with the $NH_4OH$ (4). The Al source was added and mixed (but did not dissolve). The KOH was added and mixed (the Al source dissolved). The 1,6-diaminohexane was added and mixed. Solution B was added to solution A; the seeds were added and mixed, and the rinse water was added and the whole was mixed in a household mixer for 10 minutes at low speed.

Composition synthesis mixture: (moles): 0.63 $K_2O$/0.64 $(NH_4)_2O$/3.01 R/0.108 $Al_2O_3$/10 $SiO_2$/399 $H_2O$+0.12 wt % seeds (based on gel weight) where R is 1,6-diaminohexane.

Crystallisation:

294.23 g of gel was transferred to a 300 ml stainless steel autoclave. The autoclave was placed in a-room temperature oven. The oven was heated linearly to 160° C. within 2 hours and kept for 53 hours at this temperature.

Washing and Recovery:

The product was washed with demineralised water to pH 9.5 and dried at 92° C. overnight.

Wt product obtained: 22.0 grams.

Characterisation:

XRD shows that the product is excellently crystalline ZSM-22, contaminated with ZSM-5 (ZSM-5/ZSM-22 ratio= 0.15).

EXAMPLE 5

Synthesis of ZSM-22; 75% of potassium replaced by ammonium.

Preparation of synthesis mixture (weight of reactant in grams)

| | Solution A: | |
|---|---|---|
| INGREDIENTS | COMPONENTS | QUANTITY IN GRAMS |
| LUDOX AS-40 | (1) | 54.07 |
| $H_2O$ | (2) | 75.24 |

| | Solution B: | |
|---|---|---|
| INGREDIENTS | COMPONENT | QUANTITY IN GRAMS |
| $Al_2(SO_4)_3.18\ H_2O$ | (1) | 2.60 (Baker) |
| KOH (87.5%) | (2) | 1.46 (Baker) |
| $NH_4OH$ (29.1%) | (3) | 8.49 (Baker) |
| $H_2O$ | (5) | 131.84 |
| Rinse Water | | 14.23 |
| 1,6-diaminohexane | (4) | 12.58 (Fluka) |
| ZSM-22 Seeds uncalcined | | 0.33 |

To prepare solution B, (3) was mixed with (5). (1) was added and the solution was mixed; (2) was added and the solution was mixed; (4) was added and the solution was mixed. Solution B was added to solution A, the seeds were added and the whole was mixed in a household mixer for ten minutes. The aluminium source (1) did not completely dissolve.

Composition of synthesis mixture: (moles) 0.32 $K_2O$/0.98 $(NH_4)_2O$/3.01 R/0.108 $Al_2O_3$/10 $SiO_2$/404 $H_2O$+0.11 weight percent seeds (based on gel weight) where R is 1,6-diaminohexane.

Crystallisation:

Immediately after mixing, 293.49 grams of the synthesis mixture was transferred to a 300 ml stainless steel autoclave. The autoclave was placed in a room temperature oven and the oven was heated linearly within two hours to 160° C. During the crystallisation period several spot samples were taken to observe the crystallinity using X-Ray diffraction. The product appeared to be completely crystalline after 130 hours at 160° C.

Washing and Recovery:

Each spot sample was taken after rapidly quenching the autoclave with running water. After homogenising the synthesis magma the spot sample (was taken). The final product was washed five times with about 700 ml of demineralised water to pH 9.5. The product was dried over night at 125° C.

The product was characterised by XRD which showed that it was excellently crystalline (ZSM-5/ZSM-22 ratio 0.111). Scanning electron micrographs show that the product consists of intergrown needle shaped crystals with an L/D ratio of the needles of about 25 to 30.

We claim:

1. A process for preparing a ZSM-22 zeolite comprising crystallizing a synthesis mixture comprising:
   (i) a source of silicon and/or germanium;
   (ii) a source of aluminum, iron, chromium, vanadium, molybdenum, arsenic, antimony, manganese, gallium or boron;
   (iii) a source of monovalent cation; and
   (iv) an organic structure agent; wherein seeds of preformed ZSM-22 are included in the initial synthesis mixture, and crystallization is carried out by agitating under conditions effective for forming a zeolite comprising ZSM-22 ingrown needles of crystals of less than 1 micron and having a ZSM-5/ZSM-22 peak height ratio less than 0.04; and wherein the mixture is stirred at a rate of less than 50 rpm during crystallization so that the level of agitation is reduced compared to a process in which such ZSM-22 crystals are formed under identical reaction conditions, using an initial synthesis mixture containing no seeds of preformed ZSM-22.

2. A process according to claim 1 in which the initial synthesis mixture contains at least 50 ppm of seeds.

3. A process according to claim 2 in which the initial synthesis mixture contains from 100 to 5000 ppm of seeds.

4. A process according to claim 3 in which the initial synthesis mixture contains from 500 to 3000 ppm of seeds.

5. A process according to one of claims 1 to 6 in which the crystallisation temperature is not more than 160° C.

6. The process of claim 1, wherein the zeolite has a crystobalite/ZSM-22 peak height ratio of less than 0.05.

* * * * *